(12) United States Patent
Hoyle

(10) Patent No.: US 6,905,077 B2
(45) Date of Patent: Jun. 14, 2005

(54) AGRICULTURAL SPREADER

(76) Inventor: David Stanley Hoyle, 130 Hurndal Street, P.O. Box 67, Maungaturoto, Northland (NZ)

( * ) Notice: Subject to any disclaimer, the term of this patent is extended or adjusted under 35 U.S.C. 154(b) by 0 days.

(21) Appl. No.: 10/442,710

(22) Filed: May 20, 2003

(65) Prior Publication Data

US 2003/0226916 A1 Dec. 11, 2003

(30) Foreign Application Priority Data

May 23, 2002 (NZ) ................................................ 519153

(51) Int. Cl.[7] .............................................. B05B 17/04
(52) U.S. Cl. .............................. 239/7; 239/1; 239/665; 239/670; 239/672; 239/677; 239/681; 239/684; 239/673; 239/682; 239/69; 239/71; 239/569
(58) Field of Search ............................. 239/1, 7, 67, 68, 239/69, 71, 569, 650, 665, 666, 670, 672, 677, 681, 684, 687, 673, 675, 682; 33/366.11, 366.15

(56) References Cited

U.S. PATENT DOCUMENTS

| | | | | |
|---|---|---|---|---|
| 4,277,022 A | | 7/1981 | Holdsworth et al. | |
| 4,466,230 A | | 8/1984 | Osselaere et al. | |
| 4,763,844 A | * | 8/1988 | van der Lely et al. | ...... 239/665 |
| 4,773,598 A | * | 9/1988 | Jones | .......................... 239/675 |
| 5,955,973 A | * | 9/1999 | Anderson | ....................... 239/1 |
| 5,961,040 A | * | 10/1999 | Traylor et al. | .................. 239/1 |
| 6,027,053 A | * | 2/2000 | Anderson et al. | ........... 239/681 |
| 6,092,745 A | * | 7/2000 | Seymour et al. | ............... 239/69 |
| 6,249,984 B1 | * | 6/2001 | Barsky et al. | ............ 33/366.15 |
| 6,282,967 B1 | | 9/2001 | Homburg et al. | |

FOREIGN PATENT DOCUMENTS

| | | |
|---|---|---|
| EP | 0 537 857 A2 | 10/1992 |
| EP | 0 823 197 A1 | 7/1997 |

* cited by examiner

Primary Examiner—Steven J. Ganey
(74) Attorney, Agent, or Firm—Merchant & Gould P.C.

(57) ABSTRACT

An agricultural spreader (100) includes material storage means (1) for storing agricultural material (2), at least one material spreading means (4) to spread the agricultural material (2) onto a surface (20) below the agricultural spreader (100) and variable speed material conveying means (3) for conveying the agricultural material (2) from the material storage means (1) to the material spreading means (4).

The spreader (100) further includes an inclinometer means (7) for measuring a pitch of the agricultural spreader (100) relative to a horizontal plane and control means (6) adapted to vary the speed of the variable speed material conveyor means (3) in response to at least one input, at least one of which is an output (8) from the inclinometer means (7), in order to provide a required supply rate of agricultural material (2) to the material spreading means (4).

In an alternative embodiment the control means (6) controls the area of an aperture (11) of a metering means (10).

53 Claims, 3 Drawing Sheets

AGRICULTURAL SPREADER

TECHNICAL FIELD

The present invention relates to agricultural spreaders, and in particular, but not exclusively, to a fertiliser spreader for use on undulating or hilly terrain.

BACKGROUND ART

Fertiliser spreaders of the prior art typically move fertiliser material from a bin or hopper to a spreading means, typically a spinner, blower or similar, by means of a conveyor. The rate at which the fertiliser is deposited onto the land is controlled by the speed of the conveyor relative to the speed of the vehicle over the land.

A problem with prior art fertiliser spreaders is the variation in the rate at which fertiliser is spread onto the ground when the spreader is either climbing or descending sloping or hilly terrain. The variation is dependant on the type of conveyor used, but generally the spread rates of even the best spreaders may vary by around 40% when the spreader is climbing or descending gradients of around 1:4.

The degree of variation may be of approximately the same magnitude whether the spreader is ascending or descending the hill.

The majority of fertilizer spreaders have the spreading means located at the rear of the vehicle. When ascending, fertiliser tends to flow down the conveyor from the bin or hopper to the spreading means, increasing the rate at which the fertilizer is deposited. When descending, the fertiliser tries to flow against the direction of the conveyor, reducing the spread rate.

In some cases the variation may not be noticed by the operator of the spreader as the increased fertiliser deposited when the spreader is ascending a slope may balance the decreased amount spread when descending. Nevertheless, it is recognised that the consequences of this degree of variation in the amount of fertilizer deposited on the ground may be significant.

Areas of land which have been overfertilised may not absorb the excess fast enough to prevent fertiliser from entering the groundwater. Some districts restrict spreading of fertiliser within a certain radius of lakes or rivers for this reason.

Areas of land which have been underfertilised may not grow optimally.

OBJECT OF THE INVENTION

It is an object of a preferred embodiment of the present invention to provide an agricultural spreader and/or a method of controlling a rate of supply of agricultural material to at least one spreading means of an agricultural spreader which will overcome or ameliorate problems with such agricultural spreaders and/or methods at present, or at least one which will provide the public with a useful choice.

Other objects of the present invention may become apparent from the following description, which is given by way of example only.

SUMMARY OF THE INVENTION

According to one aspect of the present invention there is provided an agricultural spreader including;

material storage means for storing agricultural material;

at least one material spreading means adapted to spread said agricultural material onto a surface which, in use, is below said agricultural spreader;

variable speed material conveying means operable at a variable speed for conveying said agricultural material from said material storage means to said at least one material spreading means;

inclinometer means for measuring a pitch of said agricultural spreader relative to a horizontal plane and providing an output representative of said pitch; and control means adapted to vary the speed of said variable speed material conveyor means in response to at least one input in order to provide a required supply rate of agricultural material to said at least one material spreading means, wherein said at least one input includes said output of said inclinometer means.

Preferably, said control means may include a microprocessor.

Preferably, said variable speed material conveying means may include a variable speed belt conveyor.

Preferably, said variable speed material conveying means may include a variable speed chain conveyor.

Preferably, said required supply rate may be substantially independent of said pitch of said agricultural spreader.

Preferably, said agricultural spreader may have a front end and an opposite rear end and said material storage means may be located closer to the front end of agricultural spreader than said at least one material spreading means.

Preferably, said speed of said variable speed material conveying means may decrease when said agricultural spreader is inclined upward.

Preferably, said speed of said variable speed material conveying means may increase when said agricultural spreader is inclined downward.

Preferably, said agricultural spreader may include wheel speed sensor means and said at least one input to said control means includes an output from said wheel speed sensor means which is representative of a groundspeed of said agricultural spreader.

Preferably, said agricultural material may include fertiliser.

According to a second aspect of the present invention there is provided a method of controlling a rate of supply of agricultural material to at least one material spreading means of an agricultural spreader having material storage means and variable speed material conveying means operable at a variable speed for conveying said agricultural material from said material storage means to said at least one material spreading means, the method including providing said agricultural spreader with inclinometer means adapted to provide an output representative of a pitch of said agricultural spreader relative to a horizontal plane, the method further including providing said agricultural spreader with control means adapted to detect at least one input and to vary the speed of said variable speed conveyor means in response to said input in order to provide a required rate of supply rate of agricultural material to said at least one spreading means, wherein said at least one input includes said output from said inclinometer means.

Preferably, said control means may include a microprocessor.

Preferably, said required supply rate may be substantially independent of said pitch of said agricultural spreader.

Preferably, the method may include the step of adapting said control means to decrease said speed of said variable speed material conveying means when said agricultural spreader is inclined upward.

Preferably, the method may include the step of adapting said control means to increase said speed of said variable speed material conveying means when said agricultural spreader is inclined downward.

Preferably, the method may include providing said agricultural spreader with wheel speed sensor means and said at least one input to said control means may include an output from said wheel speed sensor means which is representative of the groundspeed of said agricultural spreader.

According to a third aspect of the present invention there is provided an agricultural spreader including;
- material storage means for storing an agricultural material;
- at least one material spreading means adapted to spread said agricultural material onto a surface which, in use, is below said agricultural spreader;
- material conveying means for conveying said agricultural material from said material storage means to said at least one material spreading means;
- metering means between said material storage means and said at least one material spreading means, said metering means including at least one aperture through which said agricultural material passes prior to or during the agricultural material being conveyed to said at least one material spreading means and operable to vary an area of said at least one aperture;
- inclinometer means for measuring a pitch of said agricultural spreader relative to a horizontal plane and providing an output representative of said pitch;
- control means adapted to vary the area of said at least one aperture in said metering means in response to at least one input in order to provide a required supply rate of agricultural material to said at least one material spreading means, wherein said at least one input includes said output of said inclinometer means.

Preferably, said control means may include a microprocessor.

Preferably, said metering means may be located at an outlet of said material storage means.

Preferably, said required supply rate may be substantially independent of said pitch of said agricultural spreader.

Preferably, said agricultural spreader may have a front end and an opposite rear end and said material storage means may be located closer to the front end of the agricultural spreader than said at least one material spreading means.

Preferably, said area of said at least one aperture may decrease when said agricultural spreader is inclined upward.

Preferably, said area of said at least one aperture may increase when said agricultural spreader is inclined downward.

Preferably, said metering means may include a moveable gate positioned above said conveyor means.

Preferably, said agricultural spreader may include wheel speed sensor means and said at least one input to said control means includes an output from said wheel speed sensor means which is representative of the groundspeed of said agricultural spreader.

Preferably, said agricultural material may include fertiliser.

According to a fourth aspect of the present invention there is provided a method of controlling a rate of supply of agricultural material to at least one material spreading means of an agricultural spreader having a material storage means, material conveying means for conveying said agricultural material from said material storage means to said at least one material spreading means and metering means including at least one aperture through which said agricultural material passes prior to or during said agricultural material being conveyed to said at least one material spreading means and operable to vary an area of said at least one aperture; the method including providing said agricultural spreader with inclinometer means adapted to provide an output representative of a pitch of said agricultural spreader relative to a horizontal plane, the method further including providing said agricultural spreader with control means adapted to detect at least one input and to vary the area of said at least one aperture of said metering means in response to said at least one input in order to provide a required supply rate of said agricultural material to said at least one spreading means, wherein said at least one input includes said output from said inclinometer means.

Preferably, said control means may include a microprocessor.

Preferably, the method may include locating said metering means at an outlet of said material storage means.

Preferably, said required supply rate may be substantially independent of said pitch of said agricultural spreader.

Preferably, the method may include adapting said control means to decrease said area of said variable aperture when said agricultural spreader is inclined upward.

Preferably, the method may include adapting said control means to increase said area of said variable aperture when said agricultural spreader is inclined downward.

Preferably, said metering means may include a moveable gate positioned above said conveyor means.

Preferably, the method may include providing said agricultural spreader with wheel speed sensor means and said at least one input to said control means may include an output from said wheel speed sensor means which is representative of the groundspeed of said agricultural spreader.

According to a fifth aspect of the present invention there is provided an agricultural spreader including;
- material storage means for storing an agricultural material;
- at least one material spreading means adapted to spread said agricultural material onto a surface which, in use, is below said agricultural spreader;
- variable speed material conveying means operable at a variable speed for conveying said agricultural material from said material storage means to said at least one material spreading means;
- metering means between said material storage means and said at least one material spreading means, said metering means including at least one aperture through which said agricultural material passes prior to or during said agricultural material being conveyed to said at least one material spreading means and operable to vary an area of said at least one aperture;
- inclinometer means for measuring a pitch of said agricultural spreader relative to a horizontal plane and providing an output representative of said pitch; and
- control means adapted to vary one or both of a speed of said variable speed material conveying means and an area of said at least one aperture of said metering means in response to at least one input in order to provide a required supply rate of agricultural material to said at least one material spreading means, wherein said at least one input includes said output of said inclinometer means.

Preferably, said control means may include a microprocessor.

Preferably, said variable speed material conveying means may include a variable speed belt conveyor.

Preferably, said variable speed material conveying means may include a variable speed chain conveyor.

Preferably, said required supply rate may be substantially independent of said pitch of said agricultural spreader.

Preferably, said agricultural spreader may have a front end and an opposite rear end and said material storage means may be located closer to the front end of agricultural spreader than said at least one material spreading means.

Preferably, said speed of said variable speed material conveying means may decrease when said agricultural spreader is inclined upward.

Preferably, said speed of said variable speed material conveying means may increase when said agricultural spreader is inclined downward.

Preferably, said area of said at least one aperture may decrease when said agricultural spreader is inclined upward.

Preferably, said area of said at least one aperture may increase when said agricultural spreader is inclined downward.

Preferably, said metering means may include a moveable gate positioned above said conveyor means.

Preferably, said agricultural spreader may include wheel speed sensor means and said at least one input to said control means includes an output from said wheel speed sensor means.

Preferably, said agricultural material may include fertiliser.

According to a sixth aspect of the present invention there is provided a method of controlling a rate of supply of material to at least one material spreading means of an agricultural spreader having material storage means, variable speed material conveying means operable at a variable speed for conveying said agricultural material from said material storage means to said at least one material spreading means, and metering means between said material storage means and said at least one material spreading means, said metering means including at least one aperture through which said agricultural material passes prior to or during being conveyed to said at least one material spreading means and operable to vary an area of said at least one aperture, the method including providing said agricultural spreader with inclinometer means adapted to provide an output representative of a pitch of said agricultural spreader relative to a horizontal plane, the method further including providing said agricultural spreader with control means adapted to detect at least one input and to vary one or both of the speed of said variable speed conveyor means and the area of said at least one aperture of said metering means in response to said at least one input in order to provide a required rate of supply rate of agricultural material to said at least one spreading means, wherein said at least one input includes said output of said inclinometer means.

Preferably, said control means may include a microprocessor.

Preferably, said required supply rate may be substantially independent of said pitch of said agricultural spreader.

Preferably, the method may include decreasing said speed of said variable speed material conveying means when said agricultural spreader is inclined upward.

Preferably, the method may include increasing said speed of said variable speed material conveying means when said agricultural spreader is inclined downward.

Preferably, the method may include decreasing said area of said variable aperture when said agricultural spreader is inclined upward.

Preferably, the method may include increasing said area of said variable aperture when said agricultural spreader is inclined downward.

Preferably, said metering means may include a moveable gate positioned above said conveyor means.

Preferably, the method may include providing said agricultural spreader with wheel speed sensor means and said at least one input to said control means may include an output from said wheel speed sensor means.

According to a further aspect of the present invention, an agricultural spreader (as herein defined), and/or a method of controlling a rate of supply of agricultural material to at least one material spreading means of an agricultural spreader (as herein defined), is substantially as herein described with reference to the accompanying drawings.

Further aspects of the invention, which should be considered in all its novel aspects, will become apparent from the following description given by way of example of possible embodiments of the invention.

BRIEF DESCRIPTION OF PREFERRED EMBODIMENTS OF THE INVENTION

Figure 1:
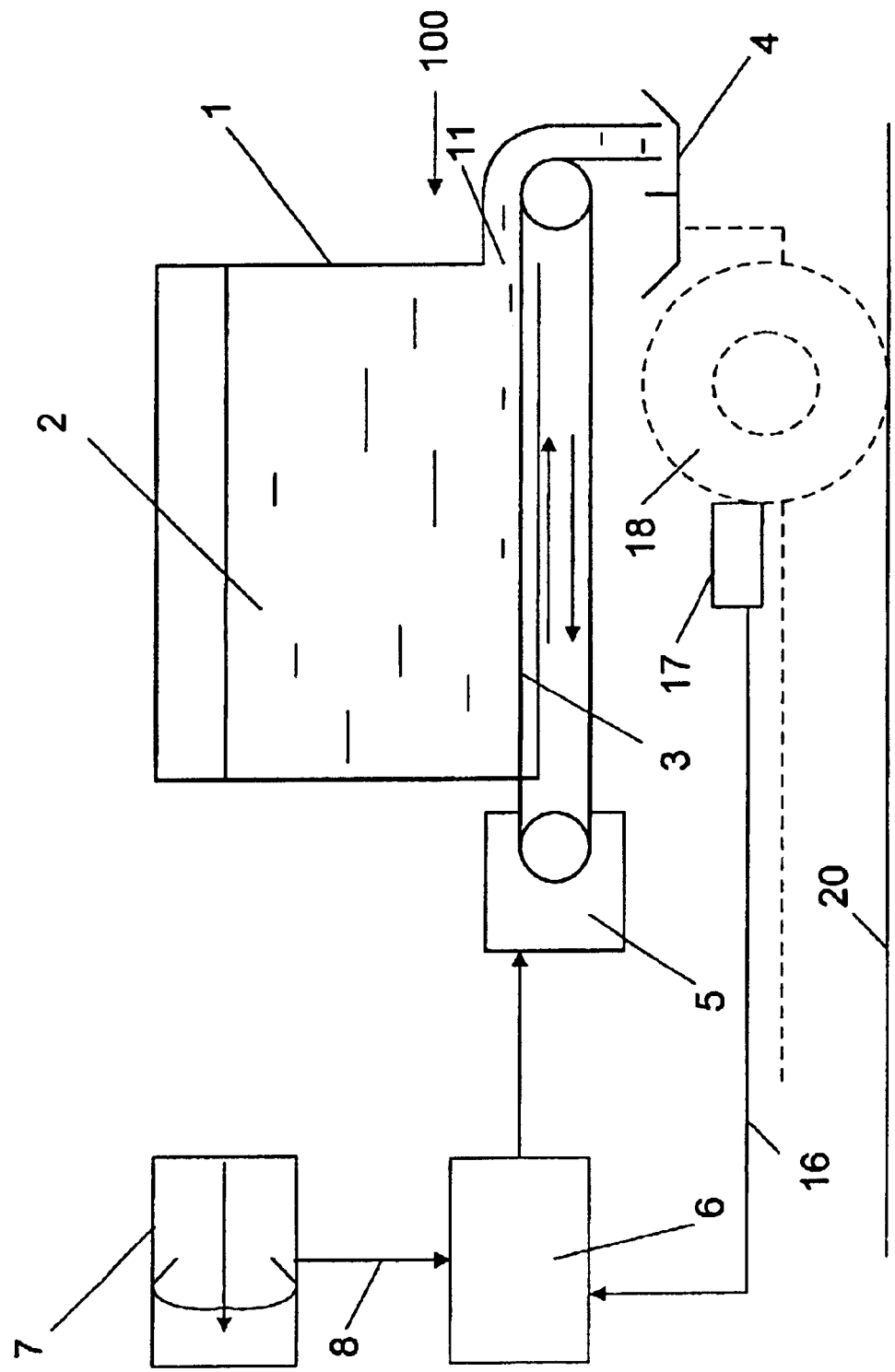
FIG. 1. Shows a diagrammatic cross-sectional side view of an agricultural spreader according to one embodiment of the present invention, with the chassis and rear wheels of the spreader shown in outline and the front wheels and cab omitted for clarity.

Referring first to FIG. 1, an agricultural spreader, generally referenced 100 and hereinafter simply referred to as a "spreader", may include a material storage means such as a bin or hopper 1 which may store agricultural material 2 such as fertiliser. A material conveying means, typically a conveyor 3, may convey the material 2 to at least one material spreading means 4, for example a spinner, blower or the like, which are adapted to spread the agricultural material 2 over the terrain or ground 20 below the spreader 100. In the embodiment illustrated in FIG. 1 a belt conveyor 3 is shown, but the present invention may also be used with other conveyors known to the art, in particular chain conveyors.

The conveyor 3 may be driven by a motor 5, which may typically be hydraulically driven, but which could also an electric motor or any other suitable variable speed motor. The speed of the motor 5, and therefore the conveyor 3, may be adjustable and may be controlled by a controller 6. The controller 6 may achieve control of the motor 5 by different methods depending on whether the motor 5 is hydraulic, electric or otherwise powered, but nevertheless the controller 6 may control the speed of the motor 5. The controller 6 may include components possessing some processing ability, for example a computer processor, or may perform its function by mechanical or electronic means.

An agricultural spreader according to one embodiment of the present invention may further include an inclinometer means, such as an electronic tilt sensor 7. One suitable type of tilt sensor 7 may be that described in U.S. Pat. No. 6,249,984. The tilt sensor 7 may measure the pitch of the agricultural spreader 100, and therefore the conveyor 3, relative to level ground, that is the tilt sensor 7 may measure the angle from the horizontal at which the agricultural spreader 100 is climbing or descending. The tilt sensor 7 may send an output 8, preferably an electric signal which is indicative of the pitch of the spreader 100, to the controller 6.

In some embodiments some of the abovementioned components may be combined. For example in some embodiments the controller 6 may include an integral tilt sensor 7. In other embodiments the controller 6 may be integrated into the motor 5.

The controller 6 may respond to a signal 8 from the tilt sensor 7 indicating that the spreader 100 is not on a level surface by either increasing or decreasing the speed of the conveyor motor 5 and therefore the conveyor 3. If the signal 8 indicates that the spreader 100 is climbing then the controller 6 may decrease the speed of the conveyor motor 5 in order to compensate for the increased flow of material 2 down the conveyor 3 when the conveyor 3 is sloped downward. If the signal 8 indicates that the spreader is descending then the controller 6 may increase the speed of the conveyor motor 5 in order to compensate for the decreased flow of material 2 down the conveyor 3 when the conveyor 3 is sloped downward. In this way the supply rate of material 2 to the spreading means 4 may be kept substantially independent of the pitch of the spreader 100.

The applicant believes that a linear variation in conveyor speed with pitch or incline may provide a substantially uniform supply of material 2 to the material spreading means 4, and therefore from the spreading means 4 to the ground 20. The rate of variation of conveyor speed with incline or pitch may depend on the conveyor type used. Some flat, belt type conveyors 3 may require around a 30% variation in conveyor speed for every 10° pitch or incline. Some chain conveyors 3 may require only around a 16% variation for every 10° pitch or incline. The exact rate of variation suitable for a particular conveyor 3 may be found by simple experiment.

The bin 1 and spreading means 4 of the spreader 100 described above are arranged in a common layout, with material storage means 1 nearer the front of the spreader 100, the material spreading means 4 at the rear of the spreader 100 and the conveyor 3 substantially aligned with the longitudinal axis of the spreader 100. Those skilled in the art will appreciate that if the relative positions of the material storage means 1 and the material spreading means 4 are reversed, that is if the material spreading means 4 are closer to the front of the spreader 100 than the material storage means 1, then it may be necessary to increase the speed of the conveyor 3 when the spreader is ascending and decrease the speed of the conveyor 3 when then the spreader is descending.

Preferably the tilt sensor 7 may be able to measure a pitch relative to the horizontal with respect to both the longitudinal and the transverse axes of the spreader 100. In this case the output from the tilt sensor 7 maybe used to vary the speed of the conveyor in response to a change in angle of the spreader 100 on either or both of these axes, if required. In a preferred embodiment the tilt sensor 7 may also be used as part of a roll-over warning system and may, for example, provide a warning indication such as an audible and/or visual alarm if a roll-over is imminent.

Figure 2:
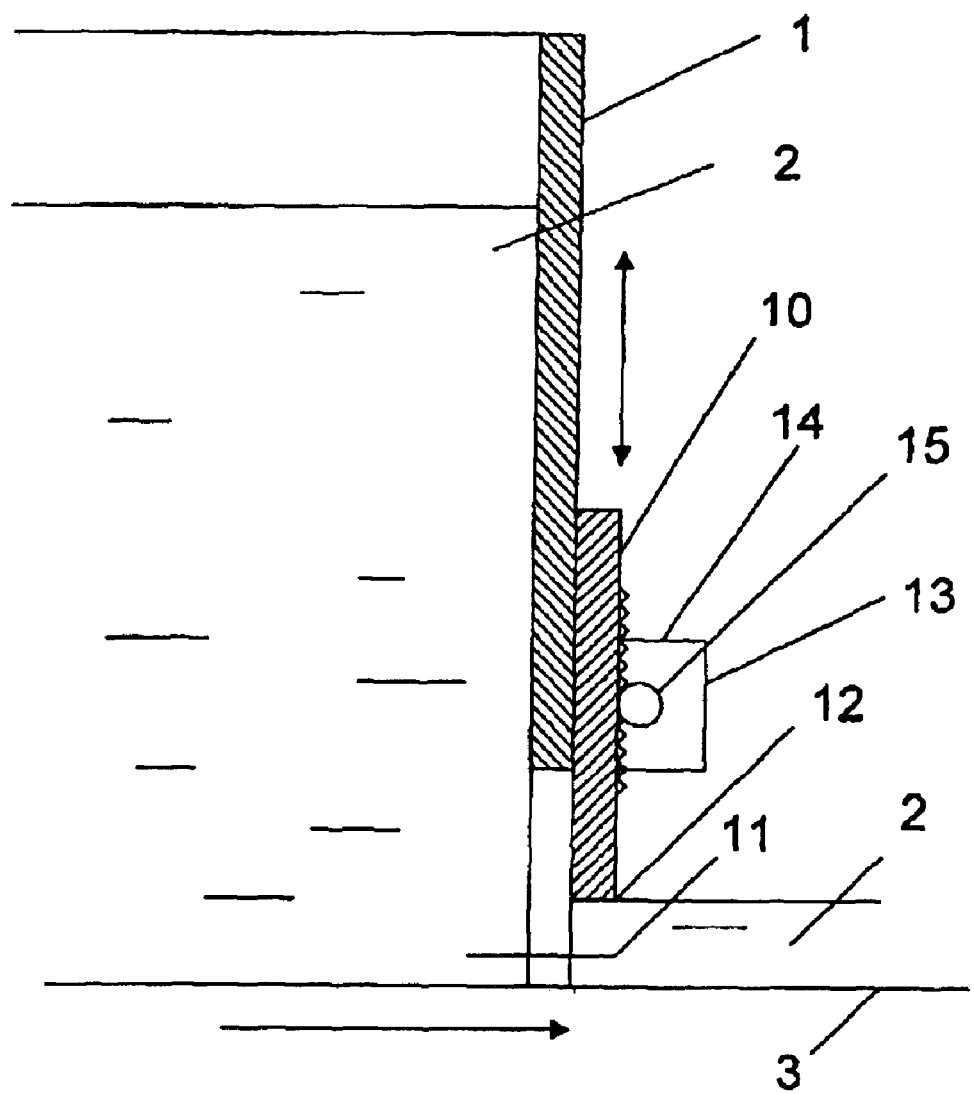
FIG. 2. Shows an enlarged diagrammatic cross-sectional side view of a metering means according to a second embodiment of the present invention.

According to a second embodiment of the present invention an agricultural spreader 100 includes a bin 1, conveyor 3 and at least one material spreading means 4 in common with the spreader of FIG. 1. Referring next to FIG. 2, in this embodiment the supply of material 2 transported by the conveyor 3 from the bin 1 to the spreading means (not shown) may be modulated by a metering means, in this case an adjustable gate 10 located at the outlet of the bin 1.

In this embodiment the control means (not shown), controls the amount of material 2 traveling along the conveyor 3 to the material spreading means by using a suitable actuator 13, in this case a motor 14 and associated sprocket 15, to vary the height of the gate 10, thereby varying the area of the aperture 11 between the bottom of the gate 12 and the conveyor 3.

Figure 3:
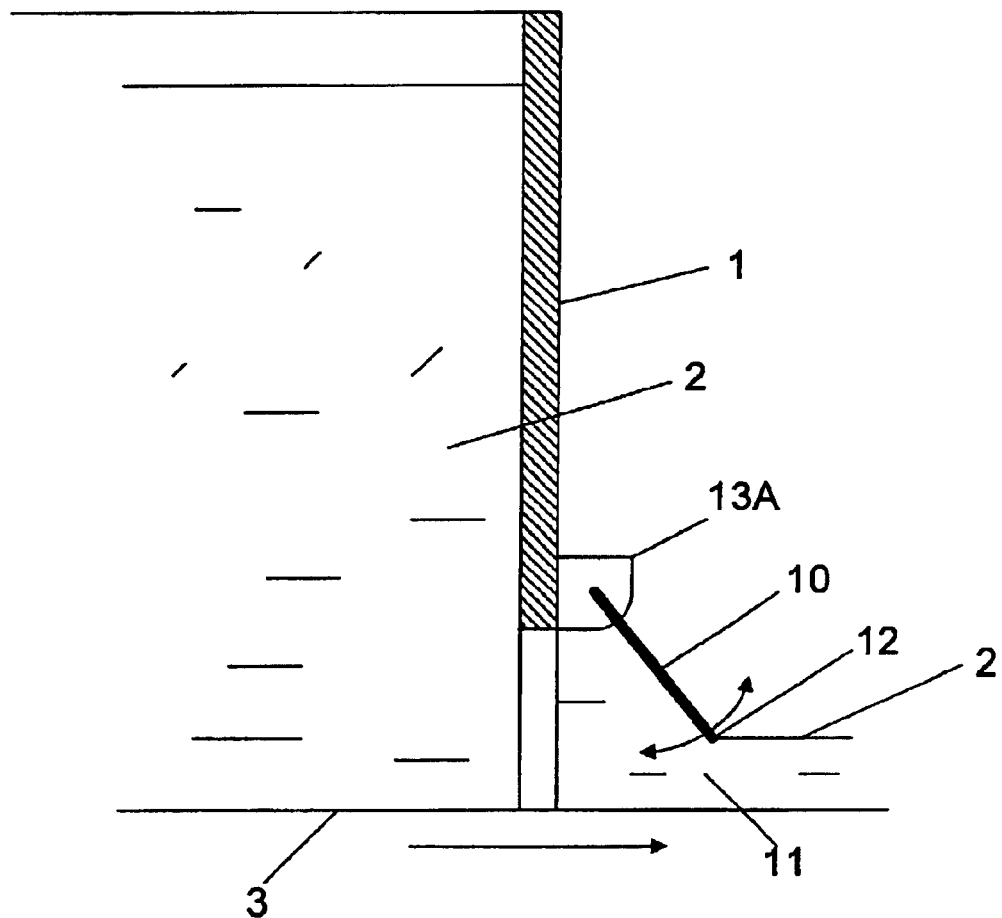
FIG. 3. Shows an enlarged diagrammatic cross-sectional side view of an alternative metering means.

FIG. 3 shows an alternative actuation means 13A adapted to tilt the gate 10 in order to vary the space between the lower edge 12 and the conveyor 3.

In the typical case that the bin or hopper 1 is in front of the spreading means (not shown) and a substantially constant flow rate of material 2 is required, the gate 10 may be adjusted upward when the spreader is pointed downhill, in order to increase the available area through which the material 2 may flow. Conversely, the gate 10 may be adjusted downward when the spreader is pointed uphill.

Those skilled in the art will appreciate that rather than providing an adjustable gate 10 above the conveyor 3 as illustrated in FIG. 2, the metering means may take the form of a variable aperture at an outlet of a hopper (not shown) located above a conveyor, thereby modulating the supply of agricultural material which is deposited onto the conveyor.

Those skilled in the art will appreciate that by controlling the aperture 11 of a metering means the flow rate of material 2 to the spreading means 4 may be controlled, even if the speed of the conveyor 3 is fixed relative to the groundspeed of the spreader 100, for example in embodiments where the spreader 100 is a trailer and the conveyor 3 is driven by a connection to one or more of the wheels.

In some embodiments of the present invention an agricultural spreader may include both the metering means with at least one variable aperture and the variable speed conveyor described above. In one such embodiment a single control means may adjust one or both of the speed of the variable speed conveying means 3 and the size of the aperture 11 of the metering means in order to provide the required rate of agricultural material to the spreading means.

The controller, whether it controls the speed of the conveyor 3 and/or the size of aperture 11 and/or any other variable, may receive an input 16 from a wheelspeed sensor 17 which indicates how fast the wheels 18 are turning, thereby indicating the groundspeed of the spreader 100. The controller 6 may vary the speed of the conveyor 3 and/or the area of the metering means aperture 11 in response to the ground speed of the spreader 100 as well as the pitch of the spreader. Alternatively, if no wheelspeed sensor 17 is used, the operator of the spreader may drive at a substantially constant speed if a constant rate of material 2 is to be spread over the ground 20, or an alternative means of determining the groundspeed of the spreader 100, such as GPS and/or radar, may be used.

If a wheelspeed sensor 17 is used the controller 6 may account for slippage of the wheels 18 in calculating the true groundspeed of the spreader 100. The controller 6 may then adjust the speed of the conveyor 3 and/or the size of the aperture 11 accordingly.

Those skilled in the art will appreciate that the present invention may provide a means of spreading agricultural material which is more consistent in its rate of spreading when used on non-level terrain than some agricultural spreaders of the prior art. The present invention may, if required, also be used to automatically vary the amount of agricultural material on a slope depending on the gradient of the slope.

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the spirit or scope of the appended claims.

What I claim is:

1. An agricultural spreader including:
   material storage means for storing agricultural material;
   at least one material spreading means adapted to spread said agricultural material onto a surface which, in use, is below said agricultural spreader;
   variable speed material conveying means operable at a variable speed for conveying said agricultural material from said material storage means to said at least one material spreading means;

inclinometer means for measuring a pitch of said agricultural spreader relative to a horizontal plane and providing an output representative of said pitch; and control means adapted to, in use, vary the speed of said variable speed material conveying means in response to at least one input in order to provide a required supply rate of agricultural material to said at least one material spreading means, wherein said at least one input includes said output of said inclinometer means.

2. The agricultural spreader of claim 1 wherein said control means includes a microprocessor.

3. The agricultural spreader of claim 1 wherein said variable speed material conveying means includes a variable speed belt conveyor.

4. The agricultural spreader of claim 1 wherein said variable speed material conveying means includes a variable speed chain conveyor.

5. The agricultural spreader of claim 1 wherein said required supply rate is substantially independent of said pitch of said agricultural spreader.

6. The agricultural spreader of claim 1 wherein said agricultural spreader has a front end and an opposite rear end and said material storage means are located closer to the front end of agricultural spreader than said at least one material spreading means.

7. The agricultural spreader of claim 6 wherein said speed of said variable speed material conveying means decreases when said agricultural spreader is inclined upward.

8. The agricultural spreader of claim 6 wherein said speed of said variable speed material conveying means increases when said agricultural spreader is inclined downward.

9. The agricultural spreader of claim 1 wherein said agricultural spreader includes speed sensor means and said at least one input to said control means includes an output from said wheel speed sensor means which is representative of a groundspeed of said agricultural spreader.

10. The agricultural spreader of any claim 1 wherein said agricultural material includes fertiliser.

11. A method of controlling a rate of supply of agricultural material to at least one material spreading means of an agricultural spreader having material storage means and variable speed material conveying means operable at a variable speed for conveying said agricultural material from said material storage means to said at least one material spreading means, the method including providing said agricultural spreader with inclinometer means adapted to provide an output representative of a pitch of said agricultural spreader relative to a horizontal plane, the method further including providing said agricultural spreader with control means adapted to, in use, detect at least one input and to vary the speed of said variable speed conveying means in response to said at least one input in order to provide a required rate of supply rate of agricultural material to said at least one spreading means, wherein said at least one input includes said output from said inclinometer means.

12. The method of claim 11 wherein said control means includes a microprocessor.

13. The method of claim 11 wherein said required supply rate is substantially independent of said pitch of said agricultural spreader.

14. The method of claim 11 including the step of adapting said control means to decrease said speed of said variable speed material conveying means when said agricultural spreader is inclined upward.

15. The method of claim 11 including the step of adapting said control means to increase said speed of said variable speed material conveying means when said agricultural spreader is inclined downward.

16. The method of claim 11 including the step of providing said agricultural spreader with wheel speed sensor means, wherein said at least one input to said control means includes an output from said wheel speed sensor means which is representative of the groundspeed of said agricultural spreader.

17. An agricultural spreader including:

material storage means for storing an agricultural material;

at least one material spreading means adapted to spread said agricultural material onto a surface which, in use, is below said agricultural spreader;

material conveying means for conveying said agricultural material from said material storage means to said at least one material spreading means;

metering means between said material storage means and said at least one material spreading means, said metering means including at least one aperture through which said agricultural material passes prior to or during the agricultural material being conveyed to said at least one material spreading means and operable to vary an area of said at least one aperture;

inclinometer means for measuring a pitch of said agricultural spreader relative to a horizontal plane and providing an output representative of said pitch;

control means adapted to vary the area of said at least one aperture in said metering means in response to at least one input in order to provide a required supply rate of agricultural material to said at least one material spreading means, wherein said at least one input includes said output of said inclinometer means.

18. The agricultural spreader of claim 17 wherein said control means includes a microprocessor.

19. The agricultural spreader of claim 17 wherein said metering means is located at an outlet of said material storage means.

20. The agricultural spreader of claim 17 wherein said required supply rate is substantially independent of said pitch of said agricultural spreader.

21. The agricultural spreader of claim 17 wherein said agricultural spreader has a front end and an opposite rear end and said material storage means is located closer to the front end of the agricultural spreader than said at least one material spreading means.

22. The agricultural spreader of claim 21 wherein said area of said at least one aperture decreases when said agricultural spreader is inclined upward.

23. The agricultural spreader of claim 21 wherein said area of said at least one aperture increases when said agricultural spreader is inclined downward.

24. The agricultural spreader of claim 19 wherein said metering means includes a moveable gate positioned above said conveyor means.

25. The agricultural spreader of claim 17 wherein said agricultural spreader includes wheel speed sensor means and said at least one input to said control means includes an output from said wheel speed sensor means which is representative of the groundspeed of said agricultural spreader.

26. The agricultural spreader of claim 17 wherein said agricultural material includes fertiliser.

27. A method of controlling a rate of supply of agricultural material to at least one material spreading means of an agricultural spreader having a material storage means, material conveying means for conveying said agricultural material from said material storage means to said at least one material spreading means and metering means including at least one aperture through which said agricultural material passes prior to or during said agricultural material being conveyed to said at least one material spreading means and operable to vary an area of said at least one aperture; the method including providing said agricultural spreader with inclinometer means adapted to provide an output representative of a pitch of said agricultural spreader relative to a horizontal plane, the method further including providing said agricultural spreader with control means adapted to detect at least one input and to vary the area of said at least one aperture of said metering means in response to said at least one input in order to provide a required supply rate of said agricultural material to said at least one spreading means, wherein said at least one input includes said output from said inclinometer means.

28. The method of claim 27 including the step of locating said metering means at an outlet of said material storage means.

29. The method of claim 27 wherein said required supply rate is substantially independent of said pitch of said agricultural spreader.

30. The method of claim 27 including the step of adapting said control means to decrease said area of said variable aperture when said agricultural spreader is inclined upward.

31. The method of claim 27 including the step of adapting said control means to increase said area of said variable aperture when said agricultural spreader is inclined downward.

32. The method of claim 27 wherein said metering means includes a moveable gate positioned above said conveyor means.

33. The method of claim 27 including the step of providing said agricultural spreader with wheel speed sensor means, wherein said at least one input to said control means includes an output from said wheel speed sensor means which is representative of the groundspeed of said agricultural spreader.

34. An agricultural spreader including;
material storage means for storing an agricultural material;
at least one material spreading means adapted to spread said agricultural material onto a surface which, in use, is below said agricultural spreader;
variable speed material conveying means operable at a variable speed for conveying said agricultural material from said material storage means to said at least one material spreading means;
metering means between said material storage means and said at least one material spreading means, said metering means including at least one aperture through which said agricultural material passes prior to or during said agricultural material being conveyed to said at least one material spreading means and operable to vary an area of said at least one aperture;
inclinometer means for measuring a pitch of said agricultural spreader relative to a horizontal plane and providing an output representative of said pitch; and
control means adapted to vary one or both of the speed of said variable speed material conveying means and the area of said at least one aperture of said metering means in response to at least one input in order to provide a required supply rate of agricultural material to said at least one material spreading means, wherein said at least one input includes said output of said inclinometer means.

35. The agricultural spreader of claim 34 wherein said control means includes a microprocessor.

36. The agricultural spreader of claim 34 wherein said variable speed material conveying means includes a variable speed belt conveyor.

37. The agricultural spreader of claim 34 wherein said variable speed material conveying means includes a variable speed chain conveyor.

38. The agricultural spreader of claim 34 wherein said required supply rate is substantially independent of said pitch of said agricultural spreader.

39. The agricultural spreader of claim 34 wherein said agricultural spreader has a front end and an opposite rear end and said material storage means are located closer to the front end of agricultural spreader than said at least one material spreading means.

40. The agricultural spreader of claim 39 wherein said speed of said variable speed material conveying means decreases when said agricultural spreader is inclined upward.

41. The agricultural spreader of claim 39 wherein said speed of said variable speed material conveying means increases when said agricultural spreader is inclined downward.

42. The agricultural spreader of claim 39 wherein said area of said at least one aperture decreases when said agricultural spreader is inclined upward.

43. The agricultural spreader of claim 39 wherein said area of said at least one aperture increases when said agricultural spreader is inclined downward.

44. The agricultural spreader of claim 34 wherein said metering means include a moveable gate positioned above said conveyor means.

45. The agricultural spreader of claim 34 wherein said agricultural spreader includes wheel speed sensor means and said at least one input to said control means includes an output from said wheel speed sensor means.

46. The agricultural spreader of claim 34 wherein said agricultural material includes fertiliser.

47. A method of controlling a rate of supply of material to at least one material spreading means of an agricultural spreader having material storage means, variable speed material conveying means operable at a variable speed for conveying said agricultural material from said material storage means to said at least one material spreading means, and metering means between said material storage means and said at least one material spreading means, said metering means including at least one aperture through which said agricultural material passes prior to or during being conveyed to said at least one material spreading means and operable to vary an area of said at least one aperture, the method including providing said agricultural spreader with inclinometer means adapted to provide an output representative of a pitch of said agricultural spreader relative to a horizontal plane, the method further including providing said agricultural spreader with control means adapted to, in use, detect at least one input and to vary one or both of the speed of said variable speed conveying means and the area of said at least one aperture of said metering means in response to said at least one input in order to provide a required rate of supply rate of agricultural material to said at least one spreading means, wherein said at least one input includes said output of said inclinometer means.

48. The method of claim 47 wherein said required supply rate is substantially independent of said pitch of said agricultural spreader.

49. The method of claim 47 including the step of decreasing said speed of said variable speed material conveying means when said agricultural spreader is inclined upward.

50. The method of claim 47 including the step of increasing said speed of said variable speed material conveying means when said agricultural spreader is inclined downward.

51. The method of claim 47 including the step of decreasing said area of said variable aperture when said agricultural spreader is inclined upward.

52. The method of claim 47 including the step of increasing said area of said variable aperture when said agricultural spreader is inclined downward.

53. The method of claim 47 including the step of providing said agricultural spreader with wheel speed sensor means, wherein said at least one input to said control means includes an output from said wheel speed sensor means.

* * * * *